United States Patent
Bhargav et al.

(10) Patent No.: US 10,282,392 B2
(45) Date of Patent: May 7, 2019

(54) INTERACTING WITH DATA FROM A DOCUMENT VIA DOCUMENT AN APPLICATION PAGES

(71) Applicant: MICROSOFT TECHNOLOGY LICENSING, LLC, Redmond, WA (US)

(72) Inventors: Rajat Bhargav, Hyderabad-IDC (IN); Raghvendra Maloo, Hyderabad-IDC (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/932,612

(22) Filed: Nov. 4, 2015

(65) Prior Publication Data

US 2016/0055128 A1    Feb. 25, 2016

Related U.S. Application Data

(63) Continuation of application No. 13/550,863, filed on Jul. 17, 2012, now abandoned.

(51) Int. Cl.
*G06F 17/00* (2019.01)
*G06F 17/21* (2006.01)
*G06F 17/24* (2006.01)

(52) U.S. Cl.
CPC .......... *G06F 17/211* (2013.01); *G06F 17/246* (2013.01)

(58) Field of Classification Search
CPC ..... G06F 17/246; G06F 17/243; G06F 17/211
See application file for complete search history.

(56) References Cited

U.S. PATENT DOCUMENTS 7,299,406 B2    11/2007  Schnurr
8,032,567 B2    10/2011  Schemer et al.
(Continued)

FOREIGN PATENT DOCUMENTS

CN    101040280 A    9/2007
CN    101241416 A    8/2008
CN    101809610 A    8/2010

OTHER PUBLICATIONS

"Final Rejection Received for U.S. Appl. No. 13/550,863", dated Jun. 4, 2015, 12 Pages.
(Continued)

*Primary Examiner* — Howard Cortes
(74) *Attorney, Agent, or Firm* — Merchant & Gould P.C.

(57) ABSTRACT

A document application is used to interact with a document as if the document was an application. Data from the document is automatically/manually selected to be associated with the document application. The document application displays document application pages (DAPs) that are used to interact with the document. One or more DAPs are automatically created using the selected data along with any rules associated with the data. For example, column names from selected data in the document may be used to create data entry/display fields within one or more DAPs and the rules may be used to specify how to interact with the data in the document application. The automatically created default DAPs may be customized by a user. For example, one DAP may be configured to be the starting page for the document application and another DAP may be configured to display a chart.

22 Claims, 18 Drawing Sheets

(56) References Cited

U.S. PATENT DOCUMENTS

| | | | |
|---|---|---|---|
| 2002/0082857 A1* | 6/2002 | Skordin | G06F 17/243 705/1.1 |
| 2006/0007189 A1 | 1/2006 | Gaines, III et al. | |
| 2006/0059414 A1 | 3/2006 | Cory et al. | |
| 2006/0218085 A1* | 9/2006 | Schuchardt | G06Q 10/00 705/39 |
| 2008/0208918 A1* | 8/2008 | Yang | G06F 17/30592 |
| 2009/0089653 A1* | 4/2009 | Campbell | G06F 17/246 715/209 |
| 2009/0313537 A1* | 12/2009 | Fu | G06F 17/30905 715/212 |
| 2009/0327867 A1* | 12/2009 | Nielsen | G06F 17/2247 715/239 |
| 2010/0174974 A1* | 7/2010 | Brisebois | G06F 17/243 715/223 |
| 2010/0180213 A1 | 7/2010 | Karageorgos et al. | |
| 2010/0217694 A1* | 8/2010 | Knighton | G06Q 10/06 705/31 |
| 2010/0332404 A1 | 12/2010 | Valin | |
| 2011/0083167 A1 | 4/2011 | Carpenter et al. | |
| 2011/0130172 A1 | 6/2011 | Rao | |

OTHER PUBLICATIONS

"Non-Final Rejection Received in U.S. Appl. No. 13/550,863", dated Dec. 3, 2014, 14 Pages.
Chinese Office Action in Application 2013800381863, dated May 19, 2016, 13 pages.
"Google Docs for Mobile", Published on: May 13, 2011, Available at: http://www.google.com/mobile/docs/.
Soda, Savy, "iSpreadsheet Free (Mobile Spreadsheet)", Retrieved on: Feb. 17, 2012, Available at: http://itunes.apple.com/us/app/ispreadsheet-free-mobile-spreadsheet/id306226132?mt=8.
International Search Report for International Application No. PCT/US2013/050579 dated Dec. 6, 2013, 3 pages.
"Second Office Action and Search Report Issued in Chinese Patent Application No. 201380038186.3", dated Dec. 26, 2016, 16 Pages.
Chinese Office Action in Application 201380038186.3, dated Mar. 24, 2017, 5 pages.
Chinese Notice of Allowance in Application 201380038186.3, dated Jul. 20, 2017, 4 pages.

* cited by examiner

Monthly Expenses.spreadsheet          Budget Details

| Description | Category | Projected Cost | Actual Cost | Difference | Actual Cost Overview |
|---|---|---|---|---|---|
| Activities | Children | $40 | $40 | | ☐ |
| Medical | Children | $100 | $92 | ▼ | ☐ |
| School | Housing | $225 | $225 | | ☐ |
| Gift 1 | Gifts and | $25 | $30 | ▲ | ☐ |
| Video Purchase | Entertainment ▽ | | 3.50 | ▼ | ☐ |

Entertainment
Food
Gifts and Charity
Housing
Insurance
Loans
Personal Care
Pets

~414

Spreadsheet

Fig. 4

INTERACTING WITH DATA FROM A DOCUMENT VIA DOCUMENT AN APPLICATION PAGES

RELATED APPLICATIONS

This application is a continuation of U.S. application Ser. No. 13/550,863, filed Jul. 17, 2012, and entitled Interacting with Data from a Document via Document an Application Pages, which is hereby incorporated by reference in its entirety.

BACKGROUND

Mobile computing devices are increasingly being used to access documents. The small display size of many mobile computing devices as compared to desktop computing devices make it difficult to navigate and interact with many documents. For example, attempting to navigate to a specific location within a document and then edit the content at that location can be frustrating for a user when using the small screen of the mobile computing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A document application is used to interact with a document as if the document was an application. Data from the document is automatically/manually selected to be associated with the document application. The document application displays document application pages (DAPs) that are used to interact with the document. One or more DAPs are automatically created using the selected data along with any rules associated with the data. For example, column names from selected data in the document may be used to create data entry/display fields within one or more DAPs and the rules may be used to specify how to interact with the data in the document application. The automatically created default DAPs may be customized by a user. For example, one DAP may be configured to be the starting page for the document application and another DAP may be configured to display a chart or some computed value. A user may adjust the location/size of the fields, a name of the field, a type of chart to display, whether a field is a required field, whether a displayed value in a field is editable, whether to hide/show a field, define a help field, define a starting page for the document application, and the like. A preview may also be displayed to the user when configuring the document application and DAPs.

BRIEF DESCRIPTION OF THE DRAWINGS

FIGS. 4-14 illustrate exemplary figures showing creation of and customizing of document application pages.

DETAILED DESCRIPTION

Figure 1:
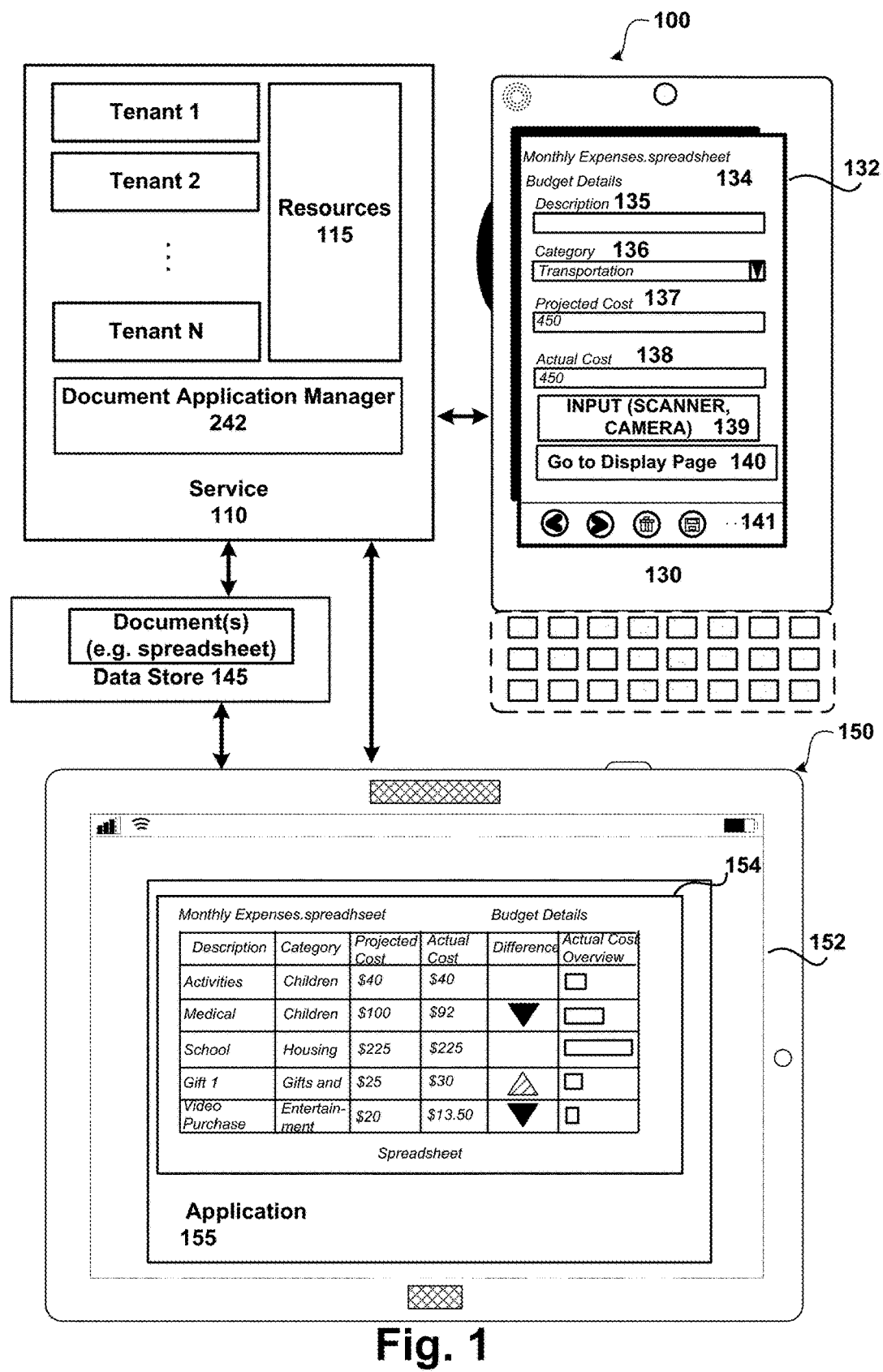
FIG. 1 illustrates an exemplary system for interacting with a document as if it were an application.

Referring now to the drawings, in which like numerals represent like elements, various embodiments will be described.

FIG. 1 illustrates an exemplary system for interacting with a document as if it were an application. As illustrated, system 100 includes service 110, mobile device 130, data store 145, and computing device 150 (e.g. a slate as shown, a desktop computing device, a mobile computing device, and the like).

As illustrated, service 110 is a cloud based and/or enterprise based service that may be configured to provide services, such as collaboration services (e.g. MICROSOFT SHAREPOINT®) and/or productivity services (e.g. MICROSOFT EXCEL®, MICROSOFT OFFICE 365™ or some other cloud based/online service that is used to interact with items (e.g. data, messages, spreadsheets, documents, charts . . . ), graphic services, web-based applications, and the like. The service may be interacted with using different computing devices (e.g. desktop, mobile) using different types of input/output. For example, a user may use touch input, hardware based input, speech/voice input, and the like. Functionality of one or more of the services/applications provided by service 110 may also be configured as a client/server based application. For example, a client device may include an application that performs document operations. Although system 100 shows a service 110 relating to productivity applications, other services/applications may be configured.

As illustrated, service 110 is a multi-tenant service that provides resources 115 and services to any number of tenants (e.g. Tenants 1-N). Each tenant may include one or more users. For example, one tenant may include 100 users whereas another tenant has 10,000 users. Multi-tenant service 110 is a cloud based service that provides resources/services 115 to tenants subscribed to the service and maintains each tenant's data separately and protected from other tenant data.

System 100 as illustrated comprises mobile device 130 (e.g. mobile phone) and computing device 150 (e.g. a touch screen input device/display such as a slate/tablet device) that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Mobile device 130 and computing device 150 includes one or more applications (e.g. application 155 illustrated on computing device 150). For example, the devices may include one or more browser applications (e.g. MICROSOFT INTERNET EXPLORER®) and one or more other applications (e.g. MICROSOFT EXCEL®, MICROSOFT SHAREPOINT®, MICROSOFT OFFICE 365™, and the like). Devices may also include other applications that are configured to connect to a web-based application/service and/or that are local to the device. The devices may also be configured to receive text/speech input and output text/speech.

As illustrated, device 150 shows exemplary display 152. Display 152 shows the use of web-based application 155 by a user of a tenant accessing a spreadsheet service (e.g. service 110) over a network, such as the Internet. For example, a user associated with device 150 may be using application 155 to view/edit spreadsheet data (e.g. spreadsheet 154). Many other types of web based applications may be accessed by one or more mobile computing devices. For example, a device may access a collaboration application, a word processing application, and the like over a network. Data, such as document data, tenant information, may be stored on a device (e.g. mobile device 130, computing device 150 and/or at some other location (e.g. network data store 145). The applications (e.g. 155) may access data on the client, on a server, from the cloud (e.g. service 110) and/or some combination.

Document application manager 242 is configured to perform operations relating to interacting with a document as if it were an application. While manager 242 is shown within service 110, the functionality of the manager may be included in other locations (e.g. on another computing device such as mobile computing device 130 and/or computing device 150) either independently or as part of another system.

Document application manager 242 is configured to automatically generate a document application from selected data within a document, such as spreadsheet 154. The documents may be stored on a local store of a computing device and/or in a network data store (e.g. data store 145). The document may many different types of documents (e.g. spreadsheets, documents with structured data such as tables and list, and the like). According to an embodiment, the documents are spreadsheet documents. The document application may be configured to perform any number of tasks. For example, a document application may be used for budgeting, for store inventory, for entry of values within a spreadsheet, and the like.

The selected data from the document may be automatically/manually selected to be associated with the document application and may include all/portion of the data within the document. For instance, each column within a spreadsheet that is editable may be automatically selected. In the current example, the description column, category column, projected cost column and actual cost column may be automatically selected since each of those columns is configured to receive user input. The difference column and actual cost overview columns are display columns that show graphics from data in the spreadsheet. According to an embodiment, since the difference and actual cost overview columns are not editable, they are not automatically selected—following a rule to exclude computed columns. Other such rules/heuristics may be applied to increase the applicability of the column selection.

In response to the selection of the data, one or more default document application pages (DAPs) for the document application are automatically created using the selected data and/or any rules associated with the data. For example, DAP 134 is created that includes fields (135, 136, 137 and 138) for each of the editable columns in spreadsheet 154. As illustrated, a name for each of the displayed fields in DAP 132 is obtained from the document (e.g. spreadsheet) and used as initial title information for the fields. Rules that are associated with the fields may also be applied to the fields. For example, if the category field is mandatory, then the document application may not allow the user to move to a next DAP until the category field is filled out.

The DAPs created by document application manager 242 may also be configured/customized (See FIGS. 9-14 and related discussion). For example, a DAP may be configured to be the starting page for the document application and a DAP may be configured to display a chart. A user may adjust the location/size of the fields, a name of the field, a type of chart to display, whether a field is a required field, whether a displayed value in a field is editable, whether to hide/show a field, define a help field, define a starting page for the document application, and the like. A preview may also be displayed to the user when configuring the document application and DAPs.

An optional input type field 139 may be included with one or more of the fields. For example, a user may set the input to use a bar code scanner (e.g. camera on the mobile device and/or a hardware based scanner) to input data into one or more of the fields. A user may also set the input to speech, keyboard, as well as other desired modes of input. A DAP field may also read data from a sensor on the hardware device e.g. GPS, NFC (Near Field Communication) sensors, fingerprint reader, etc.

The "Go to Display Page" (text used for illustrative purpose) button 140 allows configuration of a DAP to jump to in response to selecting the button. For example, such navigation allows for modeling of workflows and/or wizard like data entry.

Options 141 allow the user to navigate through the DAPs associated with the document application as well as to delete changes and save changes to the document. More details are provided in the FIGURES and related discussion below.

Figure 2:
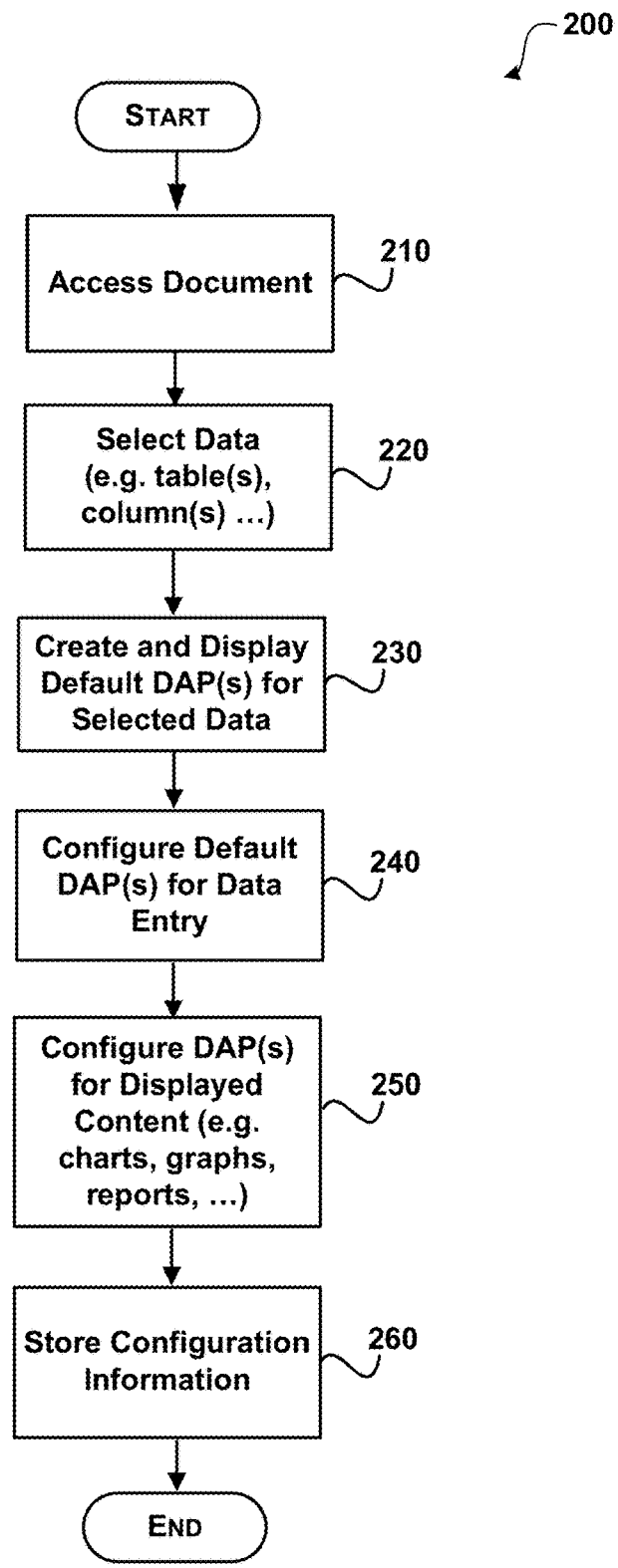
FIG. 2 shows a process for creating a document application to interact with a document.
Figure 3:
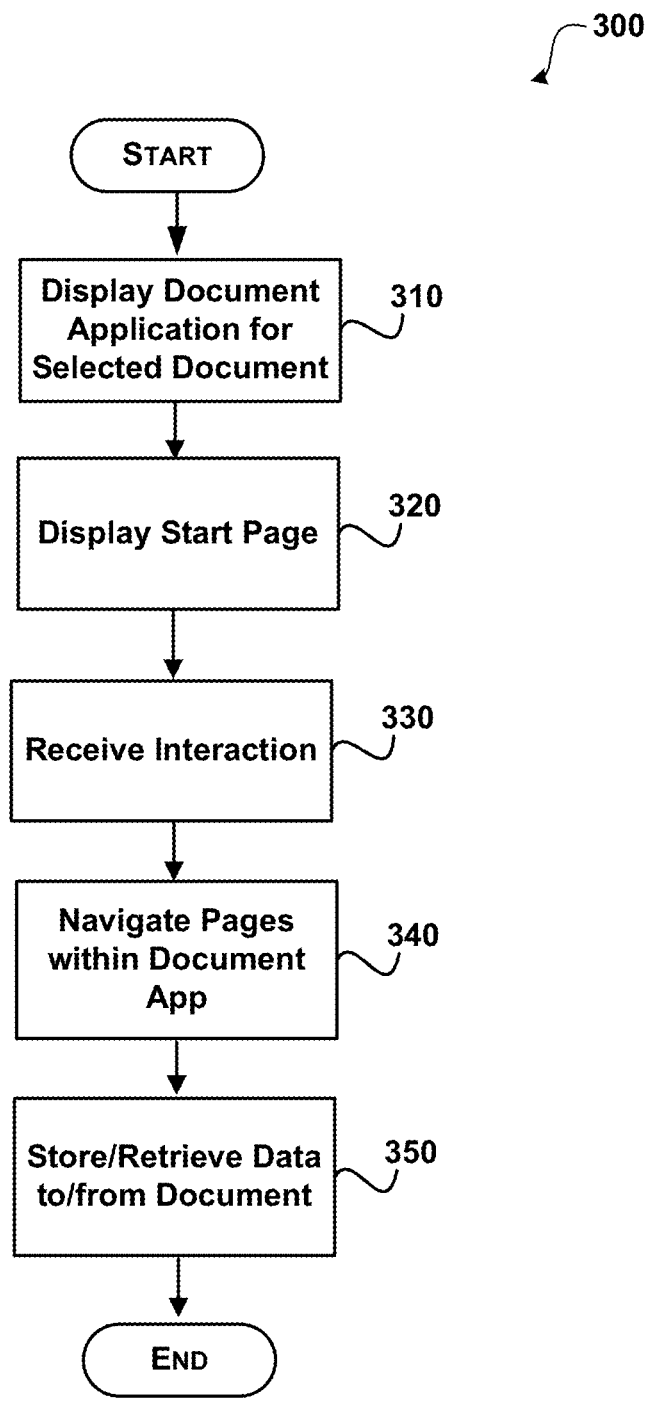
FIG. 3 illustrates a process for interacting with a document using a document application.

FIGS. 2-3 show illustrative processes for interacting with a document as an application. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof FIG. 2 shows a process 200 for creating a document application to interact with a document.

After a start operation, the process flows to operation 210 where a document is accessed. The document may be many different types of documents. For example, the document may be a spreadsheet document, a word processing document, and the like. According to an embodiment, the document includes structured data (e.g. cells, tables, graphs, . . . ) that may be interacted with (e.g. viewed, edited . . . ).

Moving to operation 220, the data to associated with the document application is selected. The data may be selected automatically and/or manually. For example, a user may manually select one or more tables within a document, manually select one or more rows/columns of data, one or more cells, and the like. The data may also be automatically selected. For example, columns within a spreadsheet may be automatically selected. Editable columns may be selected for creation of data entry DAPs and columns/cells that display graphics may be selected for possible inclusion within a display DAP. A combination of automatic/manual selection may also be performed. For example, a user may manually select a table and then editable data within the table may be manually selected for data entry document application page(s) and display data (e.g. charts, graphs) within the table may be automatically selected for display document application page(s).

Flowing to operation 230, one or more default document application pages are created and displayed based on the selected data (See FIGS. 4-14 for examples). The default document application pages are created directly from data within the document. For example, a name of the selection (e.g. table) may be the default title and the field names are the fields displayed within the page (e.g. 4 columns results in 4 fields displayed). In other words, a programmer does not write code to create the document application. The rules associated with the document and the fields are also used with the document application page. For example, a validation rule that is associated with a data field (e.g. check for integer) then the field in the document application page also checks for entry of an integer. Similarly, if a field is a view only field within the document, then the document application page for that field maintains the restriction. The fields are initially automatically positioned on the document application page. The positioning/layout may be based on characteristics of the device (e.g. resolution of display, size of display, and the like). When there is not enough space on one DAP, then the fields may be spread across multiple DAPs.

Transitioning to operation 240, the default data entry DAPs are configured. According to an embodiment, the configuration of the DAPs is received through a graphical user interface. According to an embodiment, a user may select a default layout of DAPs from templates that have different configuration layouts. Many different types of options for configuration may be displayed (e.g. See FIGS. 9-14 for examples). For example, options may include, but are not limited to: setting a DAP title; setting the DAP as a starting page for the document application; automatically showing the document application in response to opening the associated document; setting a size/location of the field; providing editing options for the fields; setting help information; setting whether the field is displayed on the DAP; setting whether the field is editable; setting whether the field is a required entry; deleting the field from the DAP; linking the DAP to another DAP; displaying a preview; setting field titles; selecting graphics/charts for display; and the like.

Figure 8:
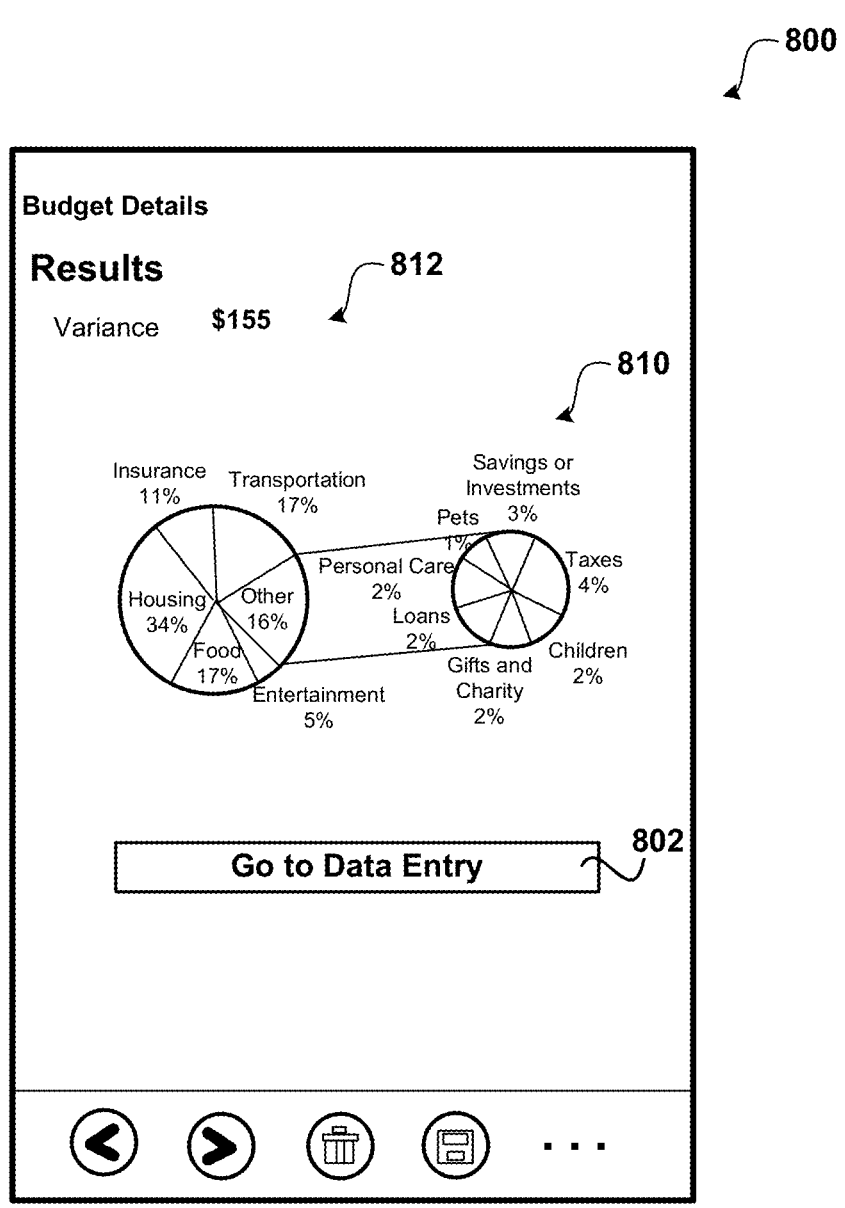

Moving to operation 250, the default display DAPs are configured. The process for configuring a display DAP (e.g. a DAP that shows a graphical display of data related to the document such as shown in FIG. 8) is similar to configuring a data entry DAP. Options may include, but are not limited to: setting a DAP title; setting the DAP as a starting page for the document application; automatically showing the document application in response to opening the associated document; setting a size/location of the graphic; providing editing options for the graphic; setting help information; linking the DAP to another DAP; displaying a preview of the graphic; setting titles; selecting graphics/charts for display; and the like. The ordering of the DAPs may also be configured. For example, a user may arrange an ordering of each of the DAPs through a graphical user interface and/or setting a number for the DAP (e.g. display first out of ten, display second out of ten . . . ).

Flowing to operation 260, the configuration information is stored. The configuration information may be stored with the document itself and/or within another location. For example, the configuration information for the DAP(s) associated with the document application may be stored in the document file and/or stored at a data store (e.g. local and/or network data store). When saved outside the document, such configuration information may be applied to similar but distinct instances of documents. DAP(s) may also be remotely updated without making changes to each document that uses it/them.

The process flows to an end operation and returns to processing other actions.

FIG. 3 illustrates a process 300 for interacting with a document using a document application.

After a start operation, the process flows to operation 310, where the document application is displayed for the associated document. The document application may be started in response to different events. For example, a user may select a graphical icon that is associated with the document application and/or the user may select the document to open the document application. A type of device and/or screen size may also be used in determining how to open the document. For example, if the display is a mobile phone display then the document application may be opened. When the display is a desktop display then the application that created the document may be used to open the document. As discussed above, the document application may be configured to be opened whenever the document itself is opened.

Moving to operation 320, the start page for the document application is displayed. The start page may be any page that is configured to be the starting page for the document application. When a starting page is not manually selected, then another page may be automatically selected (e.g. the first data entry page, the first display page, . . . ).

Flowing to operation 330, the user interacts with the document application to interact with the document. For example, the user may enter data, view data, view charts/graphs, and the like.

Transitioning to operation 340, the DAPs of the document application are navigated in response to interaction. For example, a user may select a button to move to another page, select a graphic, use touch input to navigate, use voice input to navigate, use other hardware input to navigate the pages, and the like.

Moving to operation 350, data is stored/retrieved within the document based on the interaction. For example, a user may add a value to the document, edit a value in the document, and/or retrieve data from the document to display a graphic.

The process then flows to an end operation and returns to processing other actions.

FIGS. 4-14 illustrate exemplary figures showing creation of and customizing of document application pages.

FIG. 4 shows an example document upon which a document application may be associated.

As illustrated, document 400 is a spreadsheet document that comprises a description column 402, a category column 404, a projected cost column 406, an actual cost column, 408 a difference column 410 and an actual cost overview column 412. More/fewer columns, cells may be included. As illustrated, document 400 is displayed within the application program that is configured to interact with the entire document (e.g. navigate through all of the columns, interact with each cell, and the like).

While a spreadsheet is illustrated, the document may be other types of documents. For example, a document may be a word-processing document, a project document, a calendar, an email, a message, a productivity document, and the like. Generally, the document may be any type of document that includes data to interact with. According to an embodiment, the document includes data that is structured (e.g. includes one or more of: a table, a list, cells and the like).

In the current example, the description column 402, category column 404, projected cost column 406 and the actual cost column 408 are editable fields. The difference column 410 and the actual cost overview column 412 display graphical indicators that use data from the spreadsheet. Document 400 also illustrates a drop down menu 414 that is used to select the category for the column based on the spreadsheet metadata for validation rules.

Figure 5:
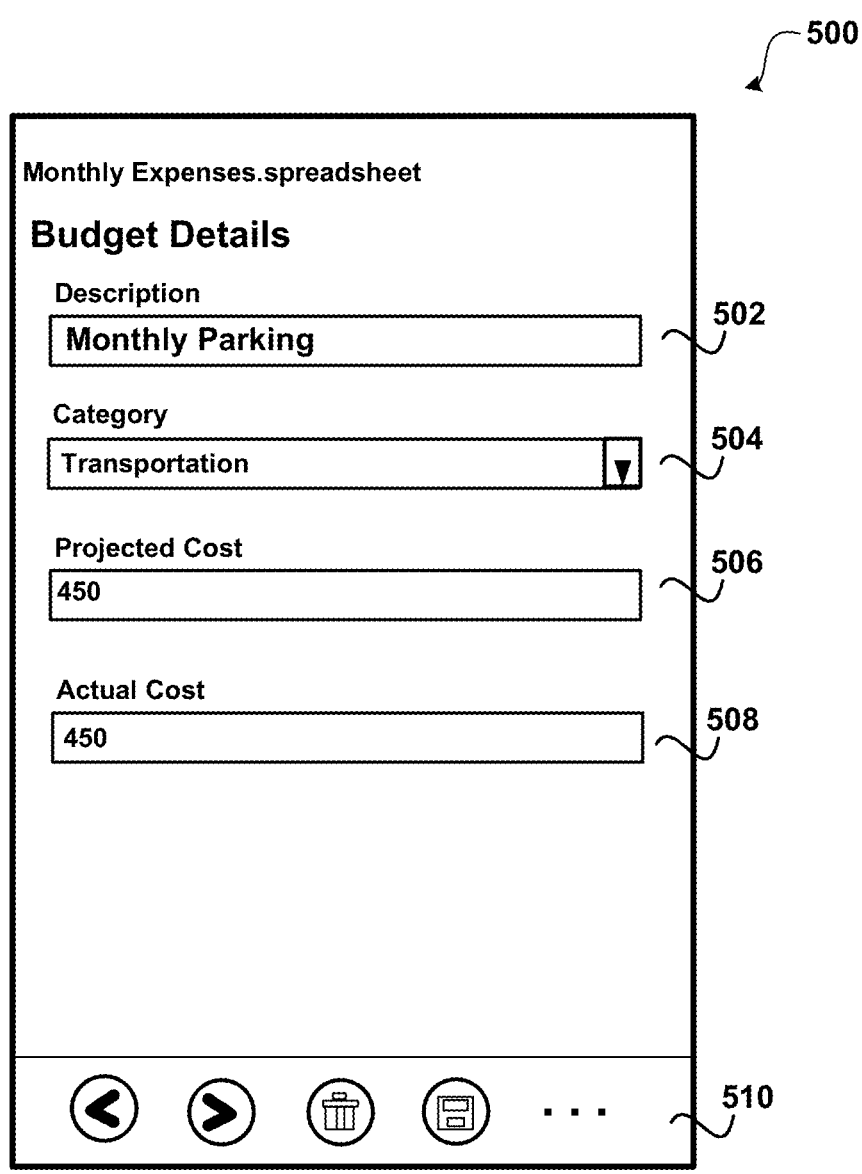

FIG. 5 illustrates a document application page for receiving input to add a row to the budget spreadsheet shown in FIG. 4.

In the current example, DAP 500 includes fields that relate to fields in document 400.

The description field 502 corresponds to the description column 402, The category field 504 corresponds to the category column 404, The projected cost field 506 corresponds to the projected cost field 406 and the actual cost field 508 corresponds to the actual cost column 408. As discussed above, DAP 500 may be automatically generated from the spreadsheet document. The category field includes an automatically generated drop down menu that allows a user to select the type of category. Other types of menus may be generated to select the type of category. Buttons 510 are used to navigate from page to page (e.g. "<" and ">") and to delete and save content. Other options may also be presented. As illustrated, a user has created a new entry "Monthly Parking", assigned the category "Transportation", set the projected cost and actual cost to $450. When the use is satisfied with their entry, they may select the save option to save the entered data to the associated document. In the current example, the data will be saved as a new row to the spreadsheet illustrated in FIG. 4.

Figure 6:
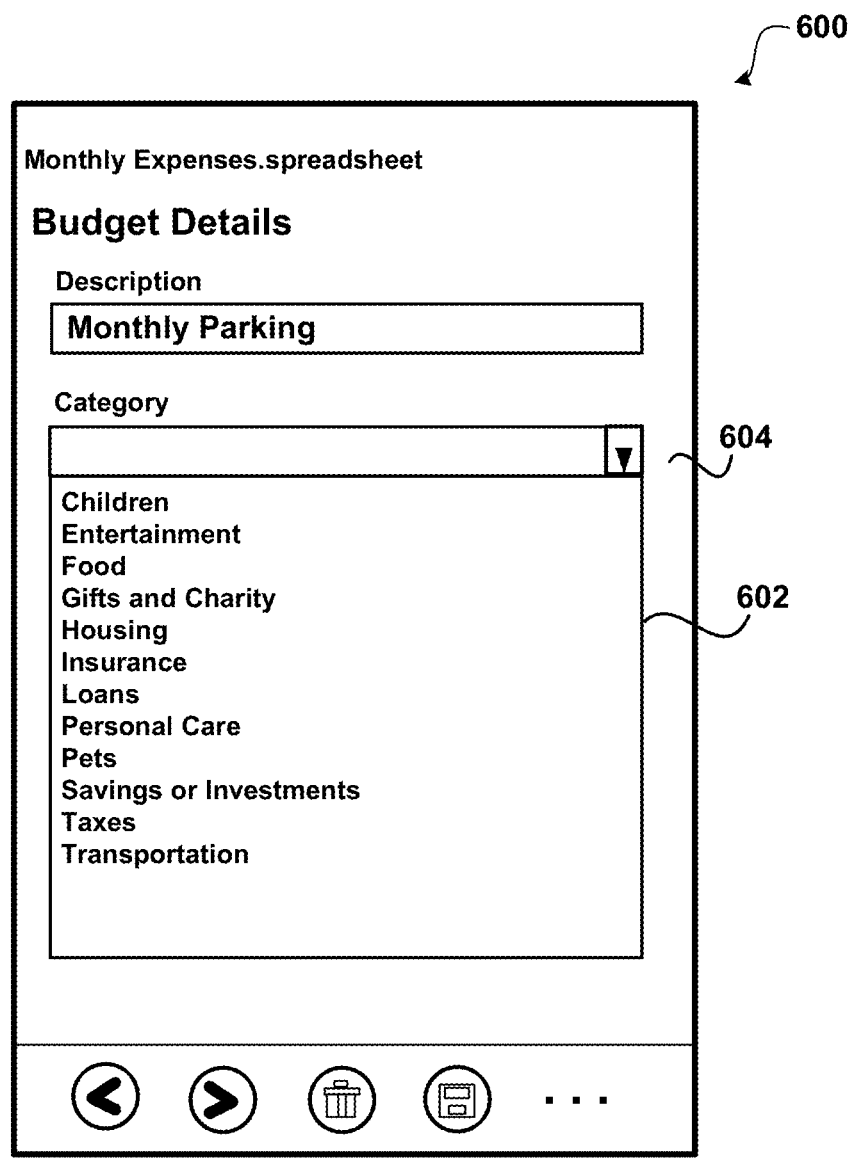

FIG. 6 illustrates a document application page 600 with an expanded drop down menu.

In the current example, a user has selected drop down menu 604 to select a category for the entry. In response to the selection, category selections are illustrated in drop down area 602. These options are those that were already defined in the document 400 and are available in the DAP without any additional programming or configuration.

Figure 7:
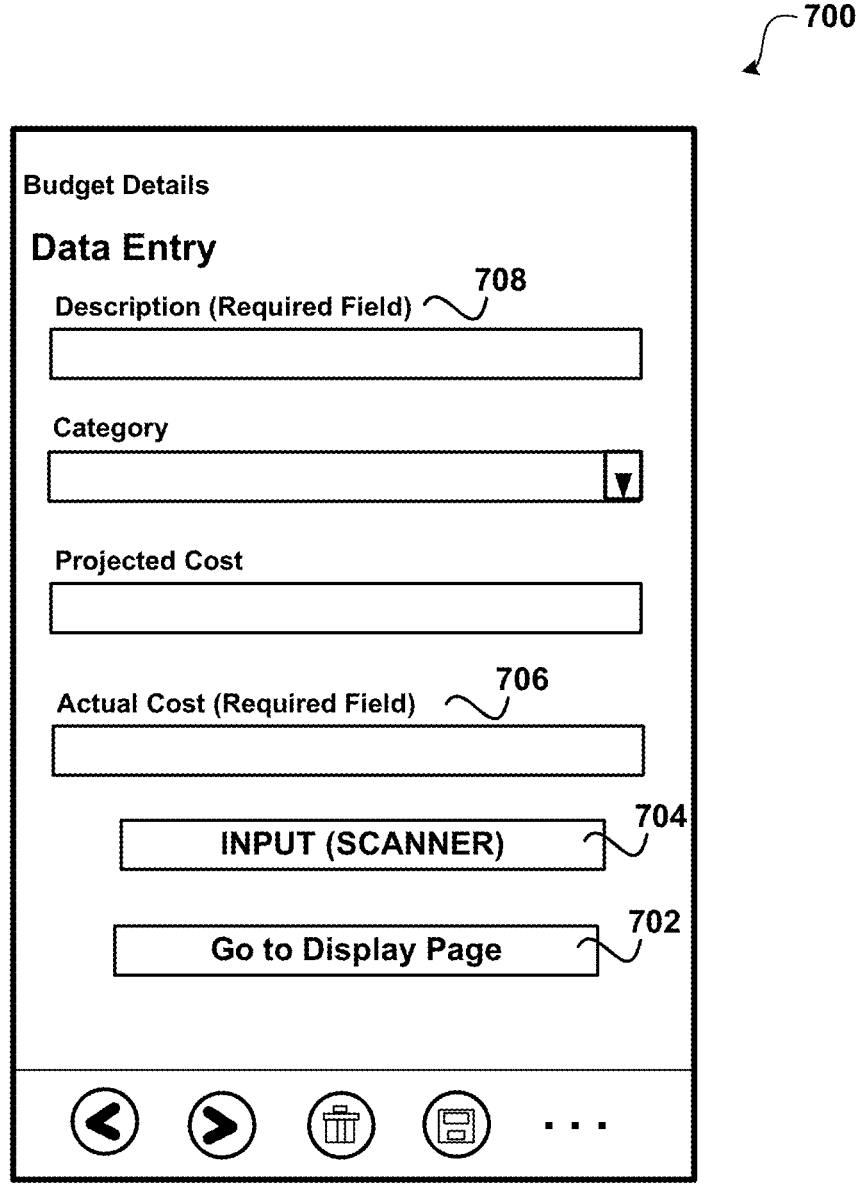

FIG. 7 shows a document application page 700 including an option to go to a display page. In the current example, a user may select the "Go to Display Page" option 702 on DAP 700 to view data (e.g. a value/chart) relating to the document. DAP 700 also shows that the description field 708 and the actual cost field 706 have been configured to be required fields (See FIG. 10). Input option 704 may also be included to specify a type of input for one or more of the fields on the DAP. In response to receiving a selection of option 702, a new DAP is displayed, such as DAP 700 in FIG. 7.

FIG. 8 illustrates a document application page 800 that shows a chart using data from the document. In the current example, DAP 800 includes a chart 810 that shows data from spreadsheet document 400 and a value from a cell 812. DAP 800 is configured when creating the different DAPs for the document application. A user may select the "Go to Data Entry" option 802 on DAP 800 to move to a preselected DAP for data entry. For example, in response to receiving a selection of option 802, DAP 700 is displayed.

Figure 9:
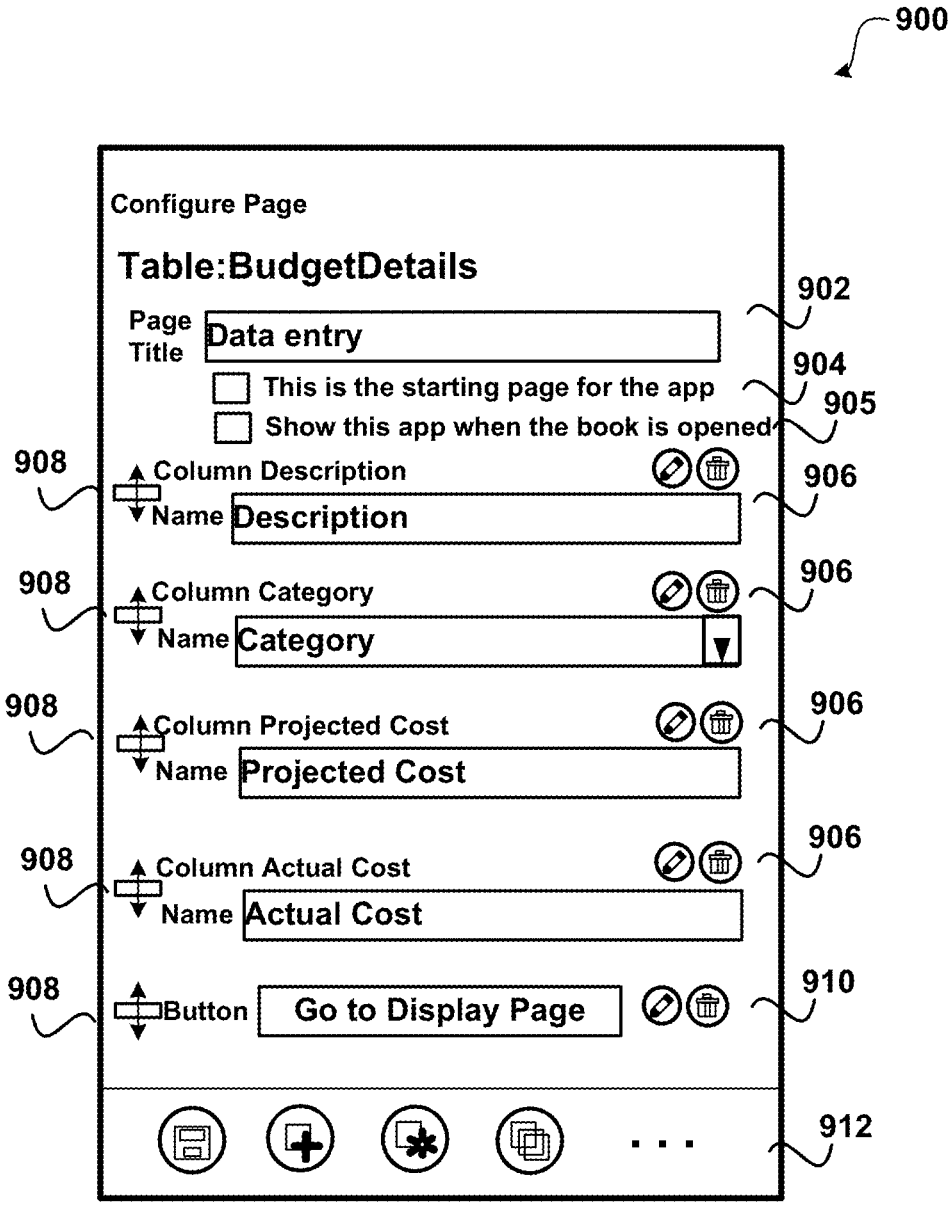

FIG. 9 shows customization of an automatically generated default document application page 900.

In the current example, DAP 900 shows different configuration options for a DAP data entry page. As illustrated, the name of the page 902 may be configured. When configuring a DAP, the DAP may be set to be the starting page for the application by selecting option 904 and/or automatically show the DAP when the document (e.g. a spreadsheet workbook) is opened by selecting option 905. For example, when the document associated with DAP 900 is opened, the document application opens instead of (or in addition to) opening the document using the normal document view that is opened using the default application that is associated with the document (e.g. the application that created the document and/or an application chosen to interact with the entire document).

As illustrated, each field includes an option 908 to adjust the location/size of the field within the DAP. For example, option 908 may be used to move/size the edit field for the column. Each field also includes an edit option and a delete option (906).

A user may also add an option (e.g. 910) to move to another page, such as a display page or another data entry page.

Buttons 912 may be used to save the customization, add a field to the DAP, change settings for the DAP, and a new DAP, change an ordering of the DAP, move to another page, and other options.

Figure 10:
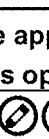

FIG. 10 illustrates configuration options for customization of fields within an automatically generated default document application page.

DAP 1000 includes further configuration options as compared to shown in FIG. 9. In the current example, a user has selected the edit button 906 for the column description field. In response to the selection of edit button 906, an area of the display for DAP 1000 is expanded (e.g. area 1002) that includes further configuration options for the field. As illustrated, area 1002 includes options for setting the name of the field 1010, optional instructions 1012, and options 1014 that allow a user to set: whether or not the field is a required field, allow a user to edit the value and hide the field from view on DAP 1000.

Figure 11:
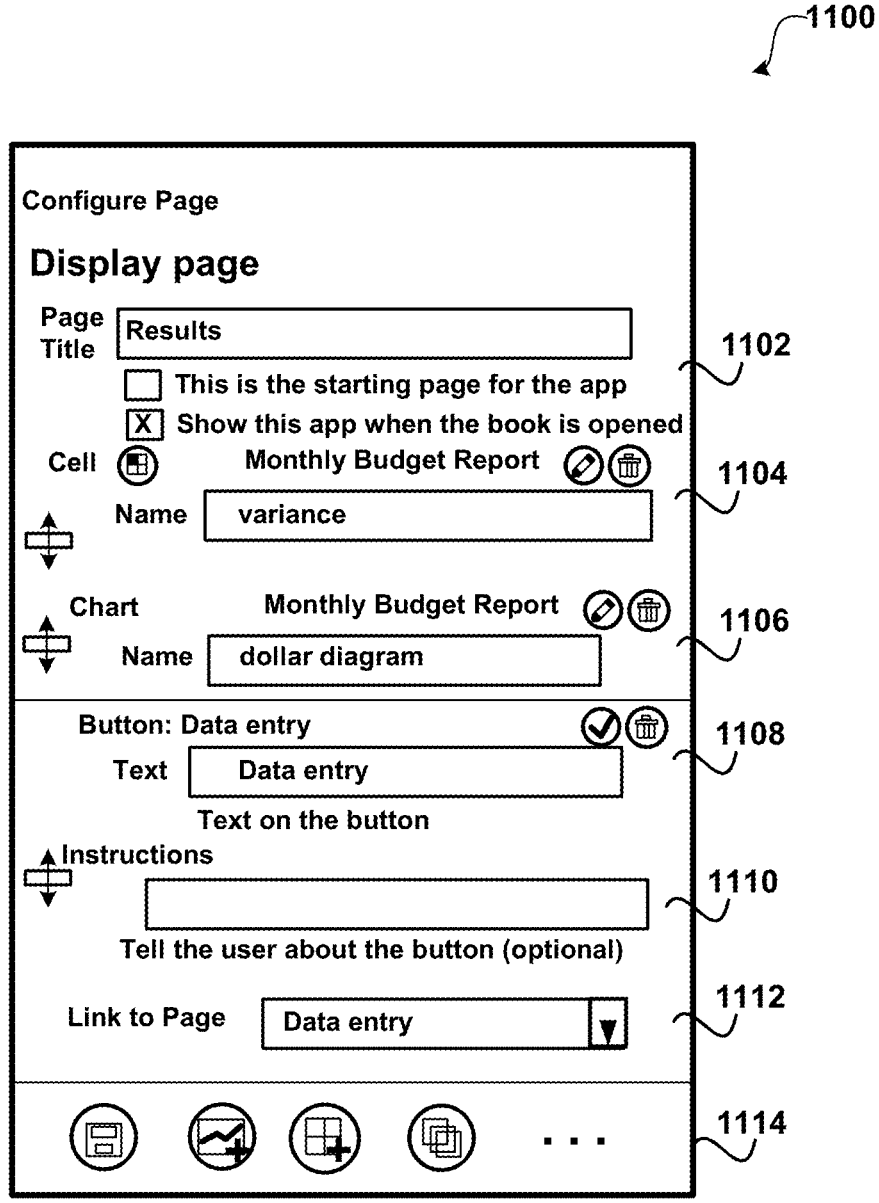

FIG. 11 shows configuration options for customization of a display document application page.

DAP 1100 includes configuration options for creating a page for displaying data from the document. A user may select existing charts/graphs/values within the document and/or define how to display data from the document.

In the current example, a user has selected to title DAP1100 as "Results" and has set the document application to start automatically when the document is opened. Options 1102 provides options for setting DAP 1100 as the starting page for the document application and showing the document application when the document is opened.

Options 1104 display options for displaying a value from the document. In the current example, the value from the document is obtained from a cell of a spreadsheet and is named "variance." While one value is illustrated as being selected for display more than one value may be associated with the display. For example, a user may select a plurality of cells.

Options 1106 illustrate configuring a display of a chart. The chart may be many different types of charts (e.g. pie, line, scatter, bar, and the like).

Options 1108 illustrate defining a button. The button may be associated with a variety of different actions. For example, the button may be associated with moving to a different data entry page within the document application, moving to another display page within the document application, and performing some other actions (e.g. switching a type of chart displayed on the page).

Options 1110 illustrate optional instructions (e.g. help) that may be displayed near the button.

Options 1112 illustrate linking the button to another page. In the current example, the user has selected to link the page to the Data entry page. According to an embodiment, the link to page option is a drop down menu that includes each of the different available pages of the document application including a new option.

Options 1114 illustrate different options for the display page including a save option, a new chart option, a new cell option, configuring an ordering of the DAPs and other options.

Figure 12:
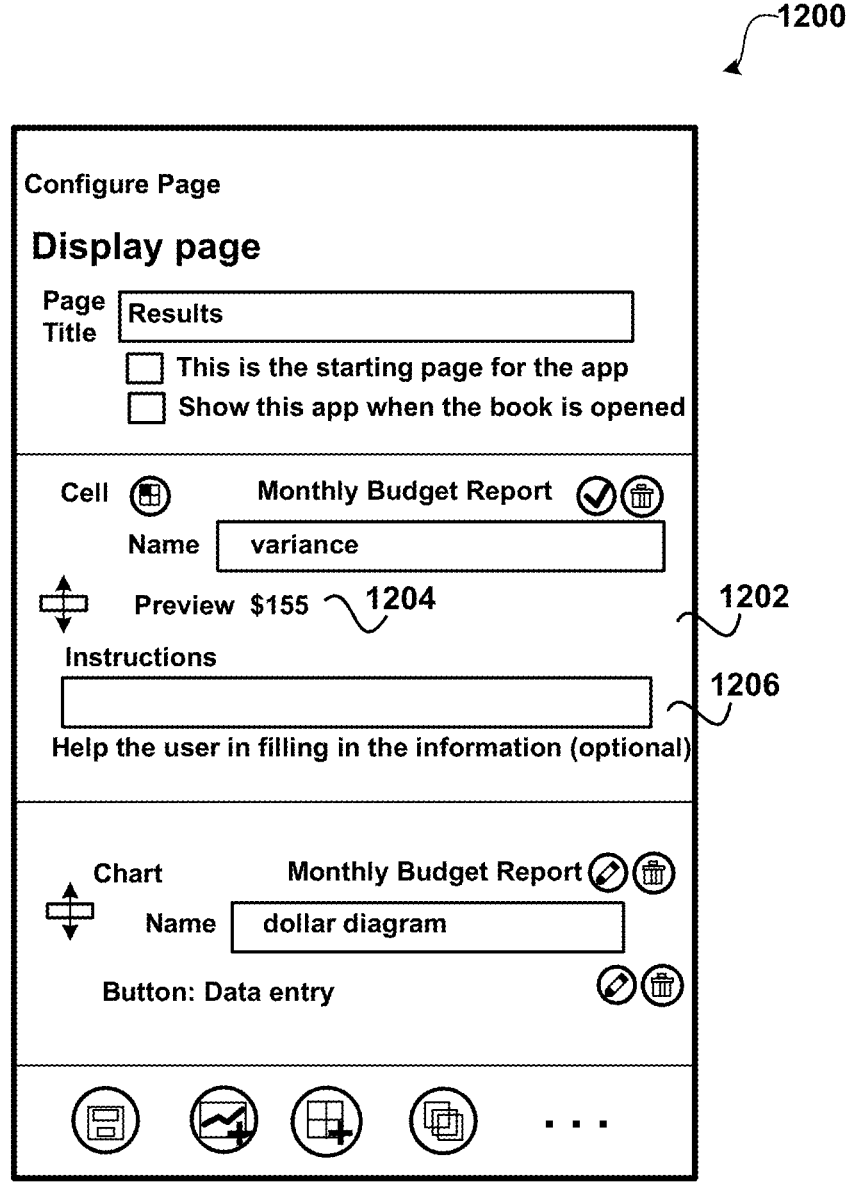

FIG. 12 illustrates an expanded area of a document application page for showing a value from a document.

DAP 1200 illustrates an expanded area for the variance area 1204 in FIG. 11 in response to the edit button being selected. As illustrated, area 1202 includes the name to display near the display value, a preview of the value from the selected cell(s) 1204, and optional instructions 1206.

Figure 13:

FIG. 13 illustrates an expanded area of a document application page for showing a chart from data related to a document.

DAP 1300 illustrates an expanded area for the chart area 1006 in FIG. 11 in response to the edit button being selected. As illustrated, area 1302 includes the name to display near the graphical chart, a preview of the chart 1304 from data from the document and/or other sources, and optional instructions 1306.

Figure 14:
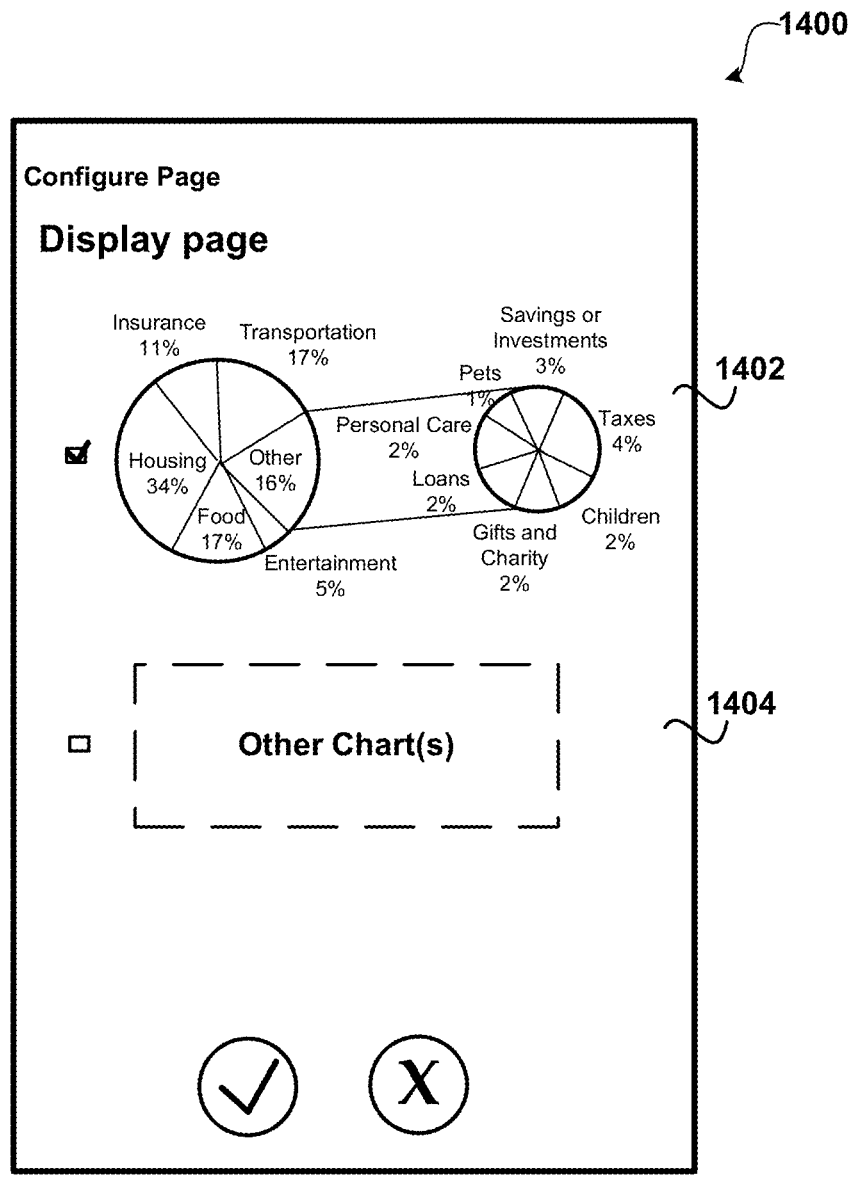

FIG. 14 illustrates a selection of an existing chart associated with the document to include within the document application.

DAP 1400 illustrates selection of the chart 1402. According to an embodiment, a display of each graphic, such as a chart/table (e.g. 1304) that is existing within the document and is associated with the selected data used for the document application is included Other chart(s) 1404 is representative of other charts that may be included within a document. A user may use the check button to include the chart within the document application.

Figure 15:
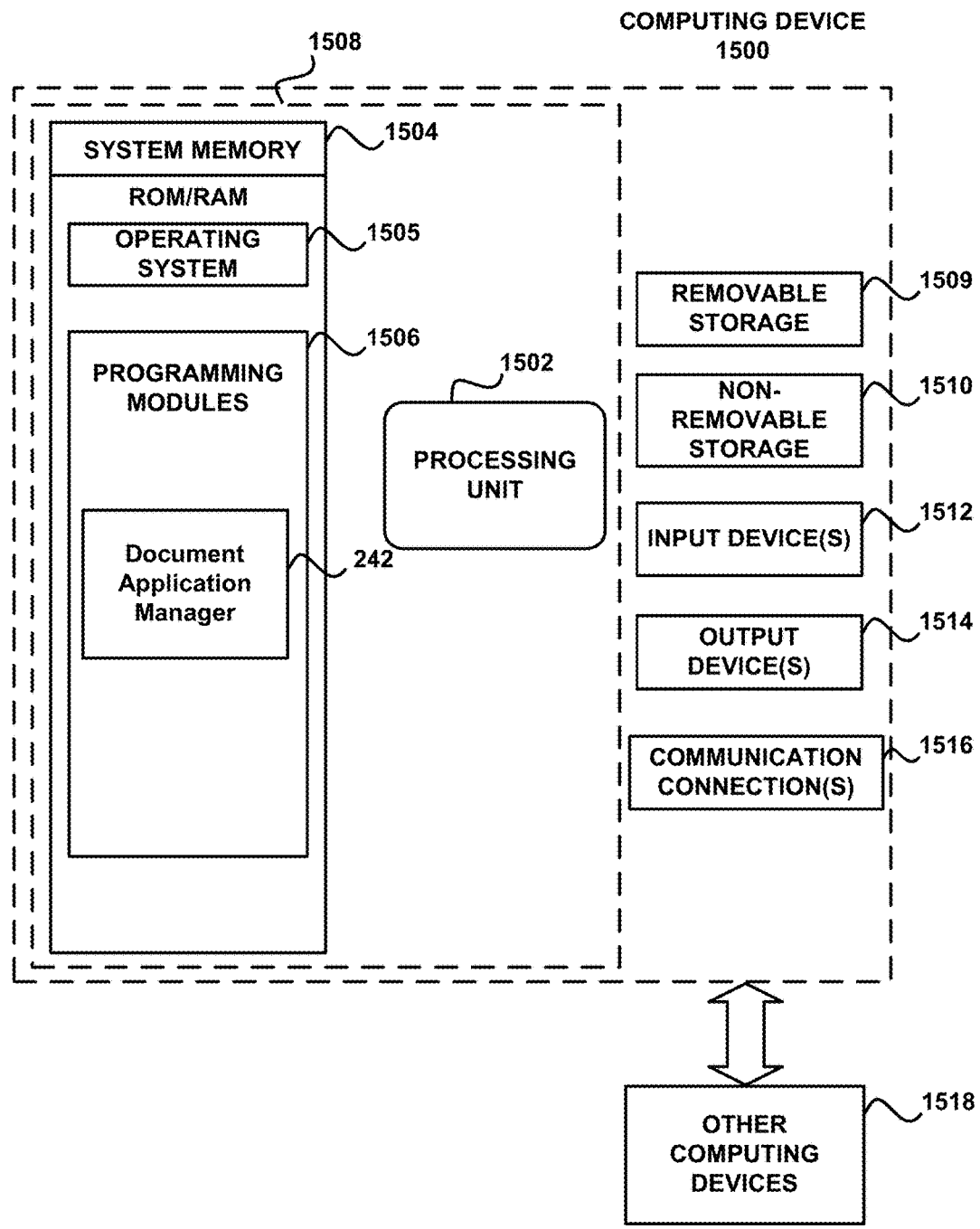
FIGS. 15-17 and the associated descriptions provide a discussion of a variety of operating environments in which embodiments of the invention may be practiced.
Figure 16A:
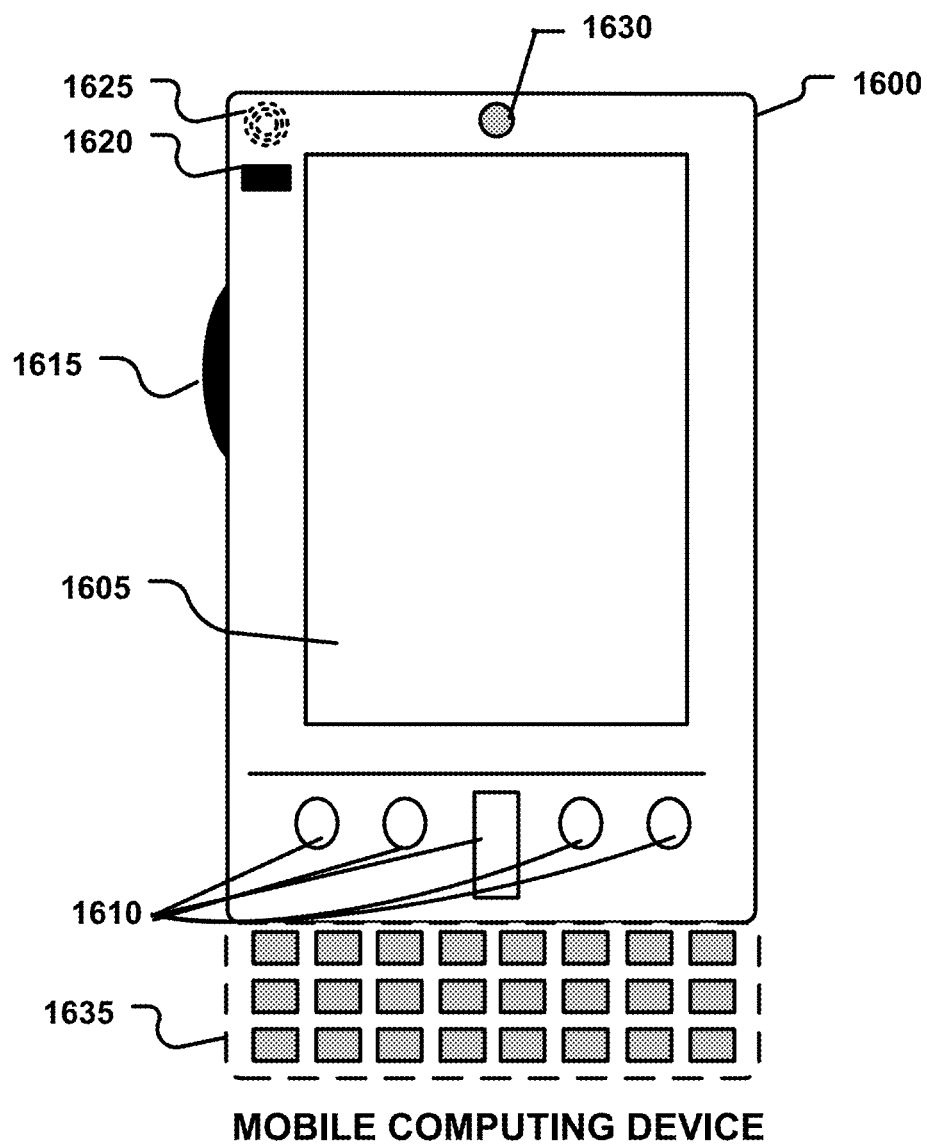
Figure 16B:
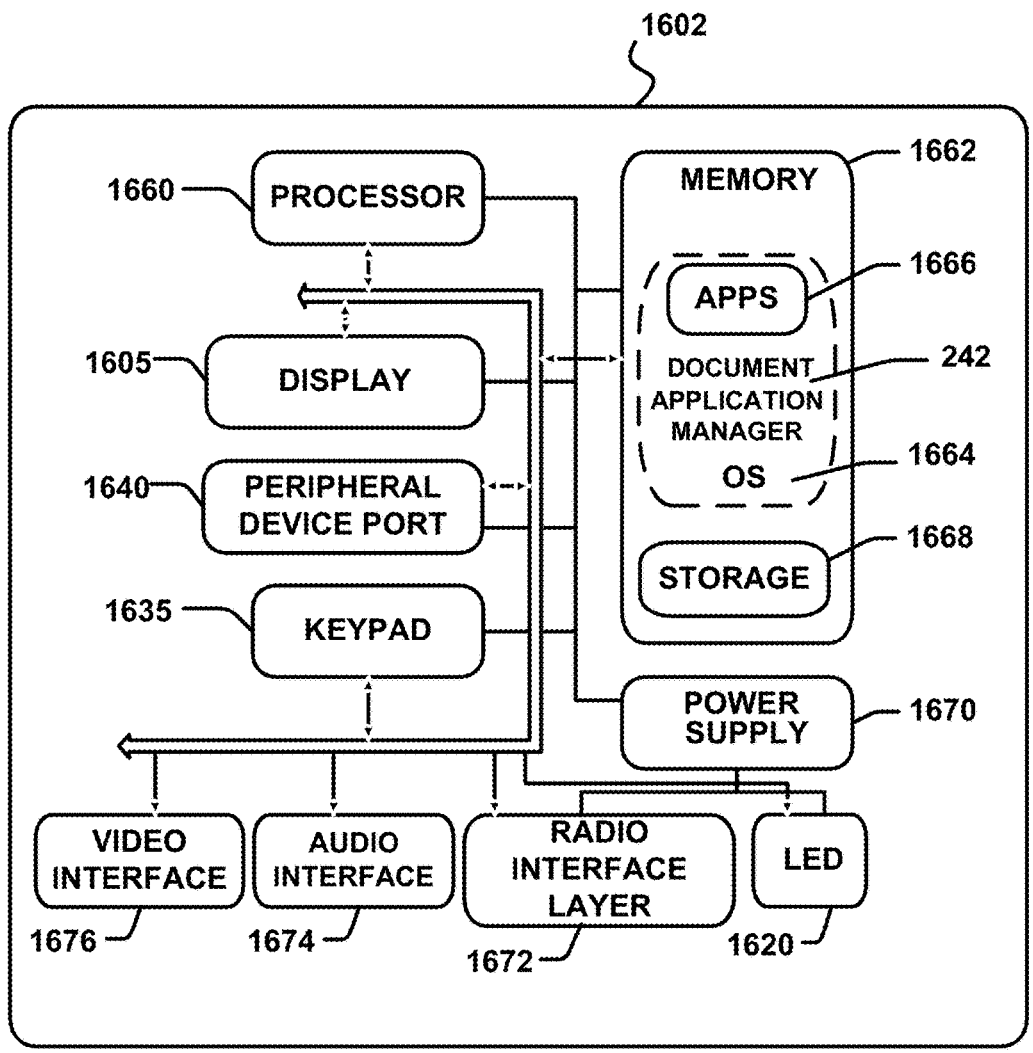
Figure 17:
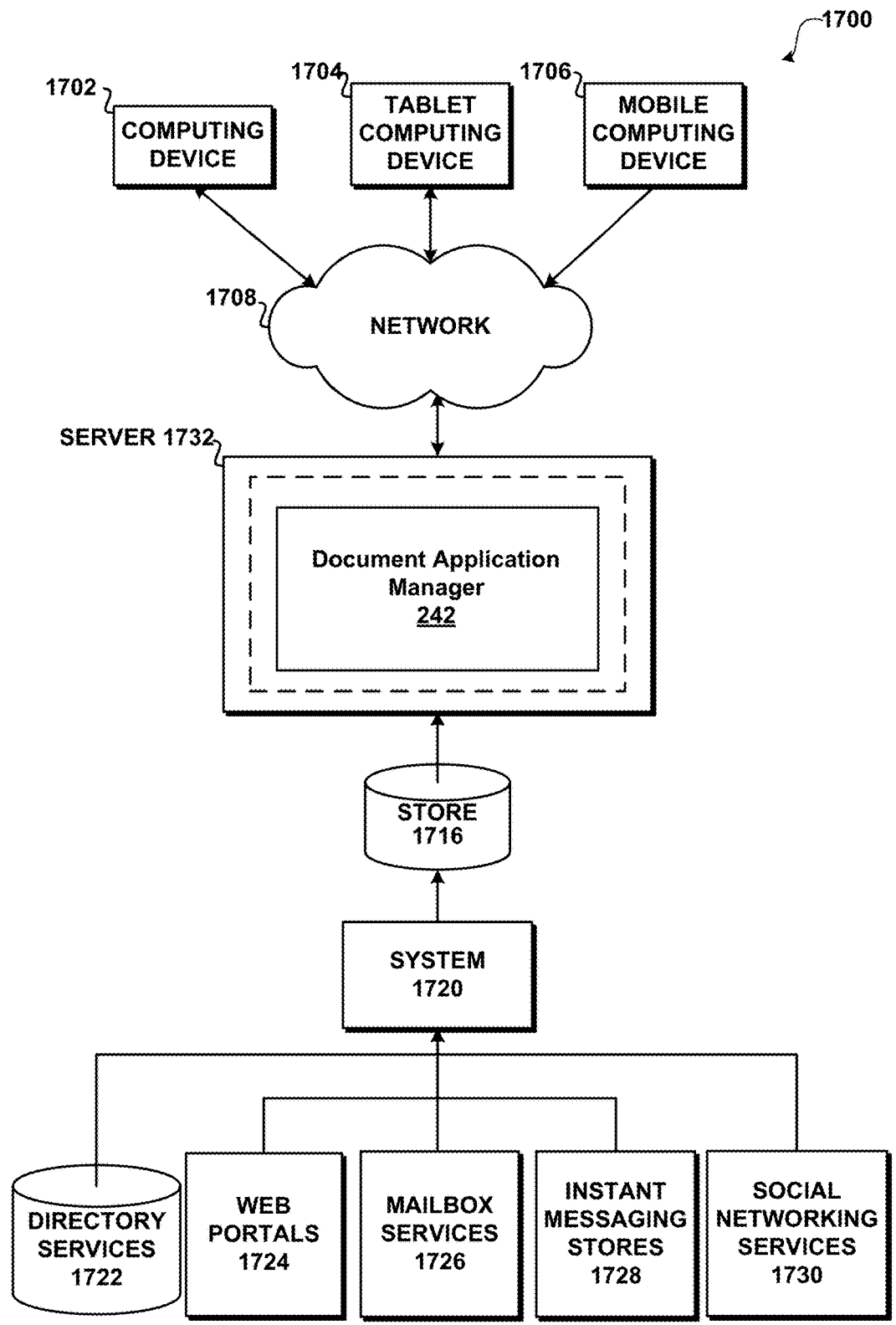

FIGS. 15-17 and the associated descriptions provide a discussion of a variety of operating environments in which embodiments of the invention may be practiced. However, the devices and systems illustrated and discussed with respect to FIGS. 15-17 are for purposes of example and illustration and are not limiting of a vast number of computing device configurations that may be utilized for practicing embodiments of the invention, described herein.

FIG. 15 is a block diagram illustrating example physical components of a computing device 1500 with which embodiments of the invention may be practiced. The computing device components described below may be suitable for the computing devices described above. In a basic configuration, computing device 1500 may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM), magnetoresistive random-access memory (MRAM)), flash memory, or any combination. System memory 1504 may include operating system 1505, one or more programming modules 1506. Operating system 1505, for example, may be suitable for controlling computing device 1500's operation. In one embodiment, programming modules 1506 may include a document application manager 242, as described above, installed on computing device 1500. Furthermore, embodiments of the invention may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510.

As stated above, a number of program modules and data files may be stored in system memory 1504, including operating system 1505. While executing on processing unit 1502, programming modules 1506, such as the manager may perform processes including, for example, methods 200 and 300 as described above. The aforementioned processes are an example, and processing unit 1502 may perform other processes. Other programming modules that may be used in accordance with embodiments of the present invention may include collaboration applications, project management applications, electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 242 may be operated via application-specific logic integrated with other components of the computing device/system 1500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, an eyes-tracking device, a motion capture device, etc. Output device(s) 1514 such as a display, speakers, a printer, etc. may also be included. The aforementioned devices are examples and others may be used. Communication connection(s) 1516 is configured to connect to other computing devices 1518.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 16A and 16B illustrate a suitable mobile computing environment, for example, a mobile telephone, a smartphone, a tablet personal computer, a laptop computer, and the like, with which embodiments of the invention may be practiced. With reference to FIG. 16A, an example mobile computing device 1600 for implementing the embodiments is illustrated. In a basic configuration, mobile computing device 1600 is a handheld computer having both input elements and output elements. Input elements may include touch screen display 1605 and input buttons 1610 that allow the user to enter information into mobile computing device 1600. Mobile computing device 1600 may also incorporate an optional side input element 1615 allowing further user input. Optional side input element 1615 may be a rotary switch, a button, or any other type of manual input element. In alternative embodiments, mobile computing device 1600 may incorporate more or less input elements. For example, display 1605 may not be a touch screen in some embodiments. In yet another alternative embodiment, the mobile computing device is a portable phone system, such as a cellular phone having display 1605 and input buttons 1610, input element 1615. Mobile computing device 1600 may also include an optional keypad 1635 and peripheral device port 1640. Optional keypad 1635 may be a physical keypad or a "soft" keypad generated on the touch screen display.

Mobile computing device 1600 incorporates output elements, such as display 1605, which can display a graphical user interface (GUI). Other output elements include speaker 1625 and LED 1620. Additionally, mobile computing device 1600 may incorporate a vibration module (not shown), which causes mobile computing device 1600 to vibrate to notify the user of an event. In yet another embodiment, mobile computing device 1600 may incorporate a headphone jack (not shown) for providing another means of providing output signals.

Although described herein in combination with mobile computing device 1600, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 16B is a block diagram illustrating components of a mobile computing device used in one embodiment, such as the computing device shown in FIG. 16A. That is, mobile computing device 1600 can incorporate system 1602 to implement some embodiments. For example, system 1602 can be used in implementing a "smart phone" that can run one or more applications similar to those of a desktop or notebook computer such as, for example, browser, e-mail, scheduling, instant messaging, and media player applications. In some embodiments, system 1602 is integrated as a computing device, such as an integrated personal digital assistant (PDA) and wireless phoneme.

One or more "apps" applications 1666 may be loaded into memory 1662 and run on or in association with operating system 1664. Examples of application programs include dialer programs, e-mail programs, PIM (personal information management) programs, word processing programs, spreadsheet programs, Internet browser programs, messaging programs, and so forth. System 1602 also includes non-volatile storage 1668 within memory 1662. Non-volatile storage 1668 may be used to store persistent information that should not be lost if system 1602 is powered down. Applications 1666 may use and store information in non-volatile storage 1668, such as e-mail or other messages used by an e-mail application, and the like. A synchronization application (not shown) may also reside on system 1602 and is programmed to interact with a corresponding synchronization application resident on a host computer to keep the information stored in non-volatile storage 1668 synchronized with corresponding information stored at the host computer. As should be appreciated, other applications may be loaded into memory 1662 and run on the mobile computing device 1600, including the document application manager 242, described above.

System 1602 has a power supply 1670, which may be implemented as one or more batteries. Power supply 1670 might further include an external power source, such as an AC adapter or a powered docking cradle that supplements or recharges the batteries.

System 1602 may also include a radio 1672 that performs the function of transmitting and receiving radio frequency communications. Radio 1672 facilitates wireless connectivity between system 1602 and the "outside world", via a communications carrier or service provider. Transmissions to and from radio 1672 may be conducted under control of OS 1664. In other words, communications received by radio 1672 may be disseminated to application programs 1666 via OS 1664, and vice versa. According to another embodiment, the OS 1664 is an optional component and operations may be performed without the use of OS 1664.

Radio 1672 allows system 1602 to communicate with other computing devices, such as over a network. Radio 1672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1602 is shown with two types of notification output devices; LED 1620 that can be used to provide visual notifications and an audio interface 1674 that can be used with speaker 1625 to provide audio notifications. These devices may be directly coupled to power supply 1670 so that when activated, they remain on for a duration dictated by the notification mechanism even though processor 1660 and other components might shut down for conserving battery power. LED 1620 may be programmed to remain on indefinitely until the user takes action to indicate the powered-on status of the device. Audio interface 1674 is used to provide audible signals to and receive audible signals from the user. For example, in addition to being coupled to speaker 1625, audio interface 1674 may also be coupled to a microphone to receive audible input, such as to facilitate a telephone conversation. In accordance with embodiments of the present invention, the microphone may also serve as an audio sensor to facilitate control of notifications, as will be described below. System 1602 may further include video interface 1676 that enables an operation of on-board camera 1630 to record still images, video stream, and the like.

A mobile computing device implementing system 1602 may have additional features or functionality. For example, the device may also include additional data storage devices (removable and/or non-removable) such as, magnetic disks, optical disks, or tape. Such additional storage is illustrated in FIG. 16B by storage 1668. Computer storage media may include volatile and nonvolatile, removable and non-removable media implemented in any method or technology for storage of information, such as computer readable instructions, data structures, program modules, or other data.

Data/information generated or captured by the mobile computing device 1600 and stored via the system 1602 may be stored locally on the mobile computing device 1600, as described above, or the data may be stored on any number of storage media that may be accessed by the device via the radio 1672 or via a wired connection between the mobile computing device 1600 and a separate computing device associated with the mobile computing device 1600, for example, a server computer in a distributed computing network such as the Internet. As should be appreciated such data/information may be accessed via the mobile computing device 1600 via the radio 1672 or via a distributed computing network. Similarly, such data/information may be readily transferred between computing devices for storage and use according to well-known data/information transfer and storage means, including electronic mail and collaborative data/information sharing systems.

FIG. 17 illustrates a system architecture 1700 for interacting with a document as an application, as described above.

Components managed via the document application manager 242 may be stored in different communication channels or other storage types. For example, components along with information from which they are developed may be stored using directory services 1722, web portals 1724, mailbox services 1726, instant messaging stores 1728 and social networking sites 1730. The manager 242, system 1720 may use any of these types of systems or the like for enabling management and storage of components in a store 1716. A server 1732 may provide communications for managed components and content to clients. As one example, server 1732 may provide productivity related services. Server 1732 may provide services and content over the web to clients through a network 1708. Examples of clients that may utilize server 1732 include computing device 1702, which may include any general purpose personal computer, a tablet computing device 1704 and/or mobile computing device 1706 which may include smart phones. Any of these devices may obtain display component management communications and content from the store 1716.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating a document application for interacting with a spreadsheet associated with a spreadsheet application on a small form computing device, the method comprising:

accessing the spreadsheet via the spreadsheet application, wherein a rule specific to interacting with the spreadsheet has been defined within the spreadsheet application, wherein the rule of the spreadsheet application defines which cells of the spreadsheet are editable and which cells of the spreadsheet are not editable;

selecting data cells from the spreadsheet;

automatically creating the document application using the selected data and the rule defined within the spreadsheet application;

automatically creating at least one default display application page (DAP) of the document application, the at least one default DAP including at least one field based on at least one of the selected data cells and the rule defined within the spreadsheet application, the at least one default DAP including a display of information obtained directly from the at least one selected data cell and the rule defined within the spreadsheet application, the at least one field automatically positioned on the at least one default DAP based on characteristics of a device upon which the at least one default DAP is displayed, wherein when there is not enough space on the at least one DAP to display the at least one field, displaying the at least one field across multiple DAPs;

displaying the at least one default DAP on the device.

2. The method of claim 1, wherein automatically creating the at least one default DAP comprises automatically generating a data entry DAP including a data field for each cell in a column of data cells in the selected data cells that is configured to receive a value.

3. The method of claim 2, further comprising automatically generating a display DAP that includes an option for configuring a graphic to display within the display DAP that uses data from the spreadsheet.

4. The method of claim 3, wherein configuring the graphic to display comprises selecting an existing graphic obtained from the spreadsheet.

5. The method of claim 1, further comprising receiving configuration information that is used to customize the at least one default DAP, wherein receiving the configuration information comprises displaying options for:

setting a name for each of the fields;
setting at least one of the default DAPs as a starting page for the document application;
automatically showing the document application in response to receiving an indication to open the spreadsheet;
setting a size/location for each of the fields;
providing editing options for fields that are editable;
setting help information for at least some of the fields;
setting whether one of the fields is displayed;
setting whether one of the field is editable;
setting whether one of the fields is a required entry; and
deleting one of the automatically generated fields from the DAP.

6. The method of claim 5, wherein receiving the configuration information comprises receiving configuration information for configuring a display DAP, including displaying options comprising:

setting a title; setting the display DAP as a starting page for the document application;
automatically showing the document application in response to opening the associated spreadsheet;
setting a size/location of a graphic generated using data from the spreadsheet;
setting help information;
displaying a preview of the graphic; and
linking the display DAP to another DAP.

7. The method of claim 1, wherein selecting the data cells from the spreadsheet comprises receiving at least one of:

a selection of a range of columns and a selection of a table of the spreadsheet.

8. The method of claim 1, further comprising displaying an option to define how to input data into at least one of the fields including an option to use a camera input and a speech input.

9. The method of claim 1, wherein the rule further comprises validating a data type of a data entry to an editable cell.

10. The method of claim 1, wherein the rule further comprises defining a mandatory data requirement for a specific cell.

11. A system for interacting with a spreadsheet associated with a spreadsheet application, comprising:

one or more processors; and
a memory including computer readable instructions, which when executed by the one or more processors cause the system to be operable to:
access the spreadsheet via the spreadsheet application, wherein a rule specific to interacting with the spreadsheet has been defined within the spreadsheet application, wherein the rule of the spreadsheet application defines which cells of the spreadsheet are editable and which cells of the spreadsheet are not editable;
select data cells from the spreadsheet;
automatically create a document application using the selected data and the rule defined within the spreadsheet application;
automatically create at least one default display application page (DAP) of the document application, the at least one default DAP including at least one field based on at least one of the selected data cells and the rule defined within the spreadsheet application , the at least one default DAP including a display of information obtained directly from the selected data cells and the rule defined within the spreadsheet application associated with the selected data cells, the at least one field automatically positioned on the at least one default DAP based on characteristics of a device upon which the at least one default DAP is displayed, wherein when there is not enough space on the at least one DAP to display the at least one field, displaying the at least one field across multiple DAPs;
display the at least one default DAP on the device.

12. The system of claim 11, wherein the system is further operable to automatically generate a data entry DAP including a data field for each cell in a column of data cells from the selected data cells that is configured to receive a value.

13. The system of claim 11, wherein the system is further operable to automatically generate a display DAP that includes an option for configuring a graphic to display within the spreadsheet that uses data from the spreadsheet.

14. The system of claim 11, wherein to configure the graphic to display comprises to select an existing graphic obtained from the spreadsheet.

15. The system of claim 11, further comprising receive configuration information that is used to customize the at least one default DAP, wherein to receive the configuration information comprises to display options for:
   setting a name for each of the fields;
   setting one of the default DAPs as a starting page for the document application;
   automatically showing the document application in response to receiving an indication to open the spreadsheet;
   setting a size/location for each of the fields;
   providing editing options for fields that are editable;
   setting help information for at least some of the fields;
   setting whether one of the fields is displayed;
   setting whether one of the field is editable;
   setting whether one of the fields is a required entry; and
   deleting one of the automatically generated fields.

16. The system of claim 15, wherein to receive the configuration information comprises to receive configuration information to configure a display DAP, including display options comprising:
   setting a title;
   setting the display DAP as a starting page for the document application;
   automatically showing the document application in response to opening the associated spreadsheet;
   setting a size/location of a graphic generated using data from the spreadsheet;
   setting help information;
   displaying a preview of the graphic; and
   linking the display DAP to another DAP.

17. The system of claim 11, wherein to select the data cells from the spreadsheet comprises to receive at least one of:
   a selection of a range of columns and a selection of a table of the spreadsheet.

18. The system of claim 11, wherein the system is further operable to display an option to define how to input data into at least one of the fields including an option to use a camera input and a speech input.

19. A memory having computer-executable instructions for interacting with a spreadsheet associated with a spreadsheet application, comprising:
   accessing the spreadsheet via the spreadsheet application, wherein a rule specific to interacting with the spreadsheet document has been defined within the spreadsheet application, wherein the rule of the spreadsheet application defines which cells of the spreadsheet are editable and which cells of the spreadsheet are not editable;
   selecting data cells from the spreadsheet;
   automatically creating a document application using the selected data and the rule defined within the spreadsheet application;
   automatically creating at least one default display application page (DAP) of the document application, the at least one default DAP including at least one field based on at least one of the selected data cells and the rule defined within the spreadsheet application, the at least one default DAP including a display of information obtained directly from the selected data cells and the rule defined within the spreadsheet application, the at least one field automatically positioned on the at least one default DAP based on characteristics of a device upon which the at least one default DAP is displayed, wherein when there is not enough space on the at least one DAP to display the at least one field, displaying the at least one field across multiple DAPs;
   displaying the at least one default DAP on the device.

20. The memory of claim 19, wherein automatically creating the at least one default DAP comprises automatically generating a data entry DAP including a data field for each cell in a column of data cells in the selected data cells that is configured to receive a value.

21. The memory of claim 20, further comprising automatically generating a display DAP that includes an option for configuring a graphic to display within the spreadsheet that uses data from the spreadsheet.

22. The memory of claim 19, wherein configuring the graphic to display comprises selecting an existing graphic obtained from the spreadsheet.

* * * * *